US010739750B2

(12) United States Patent
Georgi et al.

(10) Patent No.: US 10,739,750 B2
(45) Date of Patent: Aug. 11, 2020

(54) METHOD FOR CORRECTING DEVIATIONS IN A PRODUCTION PROCESS OF AN ARTICLE USING A HEAD-MOUNTED DISPLAY

(71) Applicant: CARL ZEISS INDUSTRIELLE MESSTECHNIK GMBH, Oberkochen (DE)

(72) Inventors: Bernd Georgi, Oberkochen (DE); Martin Rummel, Aalen (DE); Dominik Schmid, Aalen (DE); Andreas Lotze, Dresden (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/883,267

(22) Filed: Jan. 30, 2018

(65) Prior Publication Data

US 2018/0224826 A1 Aug. 9, 2018

(30) Foreign Application Priority Data

Feb. 6, 2017 (DE) .......................... 10 2017 201 827

(51) Int. Cl.
*G05B 19/402* (2006.01)
*G05B 19/404* (2006.01)

(52) U.S. Cl.
CPC .......... *G05B 19/402* (2013.01); *G05B 19/404* (2013.01); *G05B 2219/32014* (2013.01);
(Continued)

(58) Field of Classification Search
None
See application file for complete search history.

(56) References Cited

U.S. PATENT DOCUMENTS

| 10,319,128 B2 * | 6/2019 | Billi-Duran ........ G05B 23/0205 |
| 2002/0049566 A1 | 4/2002 | Friedrich et al. |
| 2003/0182005 A1 * | 9/2003 | Chu ....................... B21D 37/20 700/97 |

(Continued)

FOREIGN PATENT DOCUMENTS

| DE | 19536297 A1 | 4/1997 |
| DE | 102004009126 A1 | 9/2005 |

(Continued)

OTHER PUBLICATIONS

Dick et al. 'Injection molded high precision freeform optics for high volume applications' Adv. Opt. Techn., vol. 1 (2012), pp. 39-50.*
(Continued)

*Primary Examiner* — Bernard G Lindsay
(74) *Attorney, Agent, or Firm* — Harness, Dickey & Pierce, P.L.C.

(57) ABSTRACT

A method is disclosed for correcting deviations in a production process of an article. Initially, measured 3D surface coordinates of a first article are obtained and used to create a virtual image of the first article that is displayed on a display apparatus that is fastened to the user's head. The virtual image is superimposed on a predefined model image of the article which is also displayed on the display apparatus to enable the user to detect any region(s) where the measured first article deviates from the predefined model. The user is then able, via a gesture (e.g., hand movement) or head movement, to select a particular region of deviation and control the desired corrective action to be performed on subsequently produced articles. The present method thereby enables the experienced user to subjectively select the region(s) requiring correction action and the degree and type of corrective action to be taken.

7 Claims, 1 Drawing Sheet

(52) U.S. Cl.
CPC .............. *G05B 2219/35134* (2013.01); *G05B 2219/50062* (2013.01)

(56) References Cited

U.S. PATENT DOCUMENTS

| | | | |
|---|---|---|---|
| 2004/0073323 A1* | 4/2004 | Zhu | G05B 19/404 700/31 |
| 2006/0265177 A1 | 11/2006 | Steinbichler et al. | |
| 2007/0175875 A1 | 8/2007 | Uckelmann et al. | |
| 2009/0080766 A1 | 3/2009 | Daxauer et al. | |
| 2010/0132432 A1* | 6/2010 | Wallace | G01B 21/045 73/1.75 |
| 2011/0035952 A1* | 2/2011 | Roithmeier | G01B 11/002 33/503 |
| 2011/0130854 A1* | 6/2011 | Lettenbauer | B29C 33/3835 700/98 |
| 2013/0278725 A1 | 10/2013 | Mannan et al. | |
| 2015/0049186 A1 | 2/2015 | Pettersson et al. | |
| 2015/0253125 A1 | 9/2015 | Pettersson | |
| 2016/0325468 A1 | 11/2016 | Foss et al. | |

FOREIGN PATENT DOCUMENTS

| | | |
|---|---|---|
| DE | 102008020772 A1 | 10/2009 |
| DE | 102009032771 A1 | 1/2011 |
| EP | 1724549 A2 | 11/2006 |
| EP | 2034269 A1 | 3/2009 |
| WO | WO-20130083730 A1 | 6/2013 |

OTHER PUBLICATIONS

Fang et al. 'Precision injection molding of freeform optics' Adv. Opt. Techn. 2016; 5(4): 303-324.*

* cited by examiner

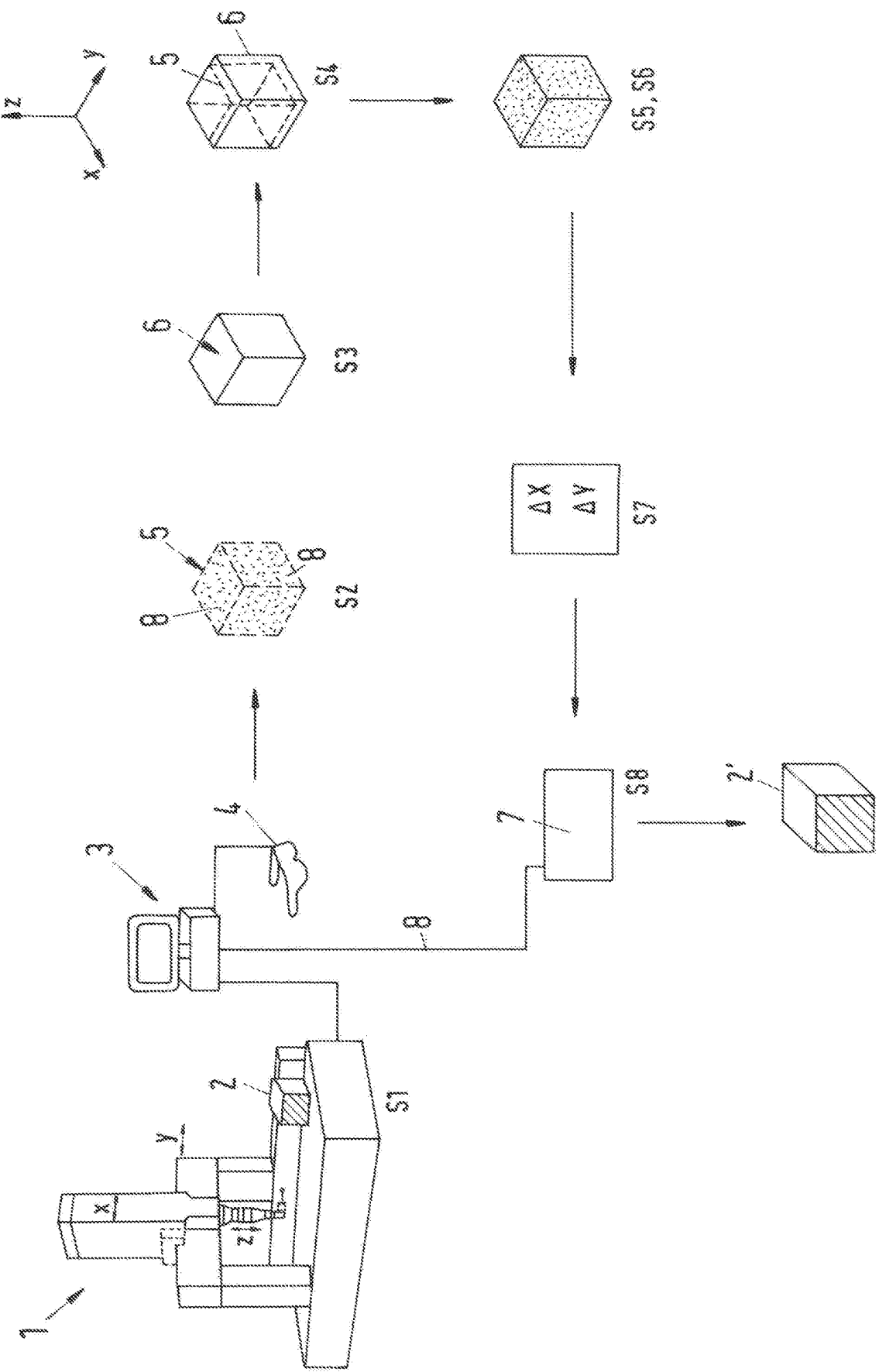

METHOD FOR CORRECTING DEVIATIONS IN A PRODUCTION PROCESS OF AN ARTICLE USING A HEAD-MOUNTED DISPLAY

CROSS-REFERENCE TO RELATED APPLICATION

This application claims priority of German patent application 10 2017 201 827.5, filed Feb. 6, 2017. The entire content of the above application is incorporated herein by reference.

BACKGROUND OF THE INVENTION

The invention relates to a method for correcting deviations in a production process of an article. Using the method, an extended graphical representation and manipulation of deviations may be effectuated in 3D coordinate metrology.

Currently, CAD models are usually presented on screens or printouts in a 2D or 3D representation. As a rule, the deviations from the intended contour are represented as deviation vectors or by means of colored areas. By way of example, this is known from https://jgarantmc.com/part-to-cad-comparison/.

If the deviations should be prepared for correction purposes, use is made, as a rule, of pointer devices such as a mouse, a trackpad or a touchscreen in order to define the desired manipulations, for example, the selection of correction regions. Since the pointer devices lack the third dimension, swift work on multiply curved surfaces is often impossible.

By way of example, provision is made in EP 2788714 A1 of a camera in a coordinate measuring machine (also abbreviated CMM below), the camera recording an image of an object. The image is used for forming a point cloud with 3D positions of target points of an object. The camera can be combined with a 3D display, for example virtual reality goggles, or a 3D touchscreen, on which the point cloud is presented. On the 3D touchscreen, a user can select points on the surface of the object that are to be measured using the CMM. However, the problem specified above is not solved thereby.

Industrial metrology is an essential constituent part of the production of workpieces. Quality assurance is also imperative according to the ISO 9000 standards in order to make products commercially available. The measurement process in industrial metrology is already a process chain per se. The actual surface of a manufactured workpiece is ascertained point-by-point with the aid of a measuring machine (in particular a CMM), a controller, a computer and the appropriate software. The coordinates of the surface points are determined by mechanical sensing using special sensors or by imaging methods. The set of actual data in the form of X-, Y-, Z-coordinates obtained in the first step is not suitable for making a statement about the quality of the workpiece. The quality of a workpiece is specified by intended dimensions and the associated tolerances. The measurement process is increasingly carried out directly in the manufacturing surroundings so that, where possible, no rejects are even produced. In the case of simple problems, for example checking a diameter, it is possible to automatically make a good/bad decision. In the case of complex parts with free-form surfaces, such as e.g. in the case of a turbine blade, a human must carry out an evaluation as soon as there is indication for a tolerance being exceeded. Depending on size, a turbine blade may cost several ten thousand Euro. Therefore, a decision is made case-by-case as to whether this is a reject, whether post-processing is possible or whether a concession can be made. The decisions are made by certified members of staff. However, it is difficult here to quickly make a correct decision.

The object of the invention consists of specifying a solution to the problems mentioned above.

SUMMARY OF THE INVENTION

A basic concept of the invention consists in the representation of a point cloud ascertained by metrology and of a predefined model on a 3D display device that is fastened to the head and in front of the eyes of a user, in particular a virtual reality or augmented reality display device, by means of which it is possible to ascertain deviations between the point cloud and a predefined model. The point cloud can be manipulated by a head or gesture control in order to correspond to the predefined model to a desired extent. Subsequently, a production process can be influenced in such a way that articles with a desired form are obtained.

In addition, or as an alternative thereto, the invention allows the preparation and presentation of status and quality information in respect of a produced object, as occur, for example, when implementing the goals in so-called "industry 4.0", in a faster and more targeted manner, as a result of which rationalization options arise.

The method specifies, in particular, a method as claimed in claim 1. Advantageous configurations are specified in the dependent claims.

The invention specifies a method for correcting deviations in a production process of an article, including:
  a) measuring surface coordinates of a first article,
  b) representing, in three dimensions, real measurement values, in particular coordinate measurement values, from the measuring of the surface coordinates with a display apparatus that is fastenable or fastened to the head, in the form of a point cloud or a point mesh, wherein the display apparatus has a gesture or head movement control (also referred to as head tracking) for manipulating displayed representations,
  c) representing, in three dimensions, a predefined model of the article using the display apparatus,
  d) comparing the predefined model to the point cloud or the point mesh,
  e) selecting at least one region from the point cloud or the point mesh which deviates from the predefined model,
  f) manipulating this region of the point cloud or the point mesh by means of the gesture or head movement control such that the point cloud or the point mesh in this region is
    i) matched to the predefined model or
    ii) approximated to the predefined model or
    iii) moved beyond the predefined model such that the point cloud or the point mesh deviates in an opposite direction to previously,
  g) transmitting at least one value of a deviation between the point cloud or the point mesh, which was obtained from the real measurement values, and the point cloud/point mesh obtained by manipulation (also referred to as manipulated point cloud/point mesh) to a computer-controlled production machine or a machine for shaping tool production or shaping tool processing, or transmitting the point cloud/point mesh obtained by manipulation to the production machine or to the machine for shaping tool production or shaping tool processing, and h) producing a further article in the production machine or producing or post-processing of a shaping tool for producing the further article, wherein the deviation is corrected or compensated when producing the further article or when producing or post-processing the shaping tool, or based on the point cloud/point mesh obtained by the manipulation.

In the performance based thereon, production or post-processing is effectuated according to the template of the manipulated point cloud/point mesh. Here, the article or the shape or the negative thereof is matched, or at least approximated, to the manipulated point cloud/point mesh.

One or more of the following advantages are obtained by the method in its general embodiment or in special embodiments:

- The method according to the invention can be carried out using existing CMMs and the control device or measurement computer thereof, wherein an aforementioned display device that is fastenable or fastened to the head (also referred to as a head-mounted display) is additionally used and combined with the control device or measurement computer. This is of particular interest for small or medium enterprises, particularly in the shaping tool construction sector or shaping mold construction, which do not have a dedicated CAD (computer-aided design) division. However, even in the case of a CAD division, the options of the invention allow time to be saved, for example when correcting tools in the injection molding field.
- Substantial simplifications and improved performances arise from a combination of novel deviation representations and handling options on three-dimensional surfaces presented using a head-mounted display.
- Commercially available head-mounted displays, such as the Microsoft Hololens®, are usable in the invention. Necessary processing power for the holographic representation is provided, for example in the case of the Hololens®, in a special graphics CPU which is integrated into the smartglasses. Hence, the aforementioned work computers used in coordinate metrology are sufficient for the novel application and it is also possible to retrofit existing computers with this system.
- Deviations can be recognized quickly and appropriate countermeasures can be taken within the scope of prototype production using 3D printers. Possible deviations in the case of 3D printer products include, for example, shrinking, sagging or warping of the parts.
- Projected reality—in shaping tool construction shaping mold construction, especially in the case of large shaping tools such as e.g. shaping molds for vehicle body parts, a cycle of two to three manual post-processes is required, as a rule, until the shaped sheet metal part obtains the specified quality. By projecting the deviations onto the shape, it is possible to save great time outlay when localizing the processing regions.
- There is the option of smoothing deviations for a practice-oriented preparation of CAD models, for example for shaping tool construction shaping mold construction or 3D printers,
- 3D observation and processing of deviations in the interior of workpieces are possible, without, as previously, having to define complex cut planes.
- There is simple processing of deviations by a head or gesture control.
- More accurate parts can be produced in a simple manner, even when producing small batches with 3D printers. To this end, a first prototype can be produced and measured, and the CAD model can be corrected accordingly. Here, it is a goal to produce the production parts within a predetermined tolerance.

The aforementioned article is any article that is producible by machines. The article is also referred to as workpiece within the scope of measuring surface coordinates. The article may have already been obtained by a production process in which, according to the invention, deviations are intended to be corrected.

The further article is, in particular, an article which does not have any deviations within predetermined tolerances. The produced or post-processed shaping tool is, in particular, a shaping tool with which an article, which does not have any deviations within predetermined tolerances, is producible.

The production process for producing the article may be, in particular, a primary forming process, a reshaping process, a separating process or a joining process, for example a joining process in a 3D printer.

An injection molding process is a specific production process, in which the method can be applied. In the case of an injection molding process, the tool must often be optimized in several iteration loops before the produced parts are within the tolerance. This problem can be reduced—by way of fewer iteration loops—or avoided, using the present invention.

In the aforementioned variant of the method, a shaping tool for producing a further article is produced or post-processed. In this variant, the production of a further article using this produced or corrected shaping tool is not yet mandatory according to the method, although it may be an optional step of the method. In this variant, the method can also be referred to as a method for producing or post-processing a shaping tool. In particular, a shaping tool to be post-processed is a shaping tool with which the first article was produced.

In particular, the shaping tool is a shaping tool for the injection casting of plastic (injection molding). When manufacturing plastic parts, use has previously been made of injection molds which, as a rule, have to be made suitable for the process in three steps before dimensionally accurate plastic parts can be produced. The reason for this lies in a deformation of the plastic parts when they have been shaped and are cooling. That is to say, no usable plastic parts arise in the first step, even if the injection mold is fault-free. Often, the deformation is not predictable because it depends on the material, on the wall thickness and on the form of the workpieces. The post-processing of the injection molds was previously carried out manually by specifically trained tool makers, or else by CAD specialists using CNC machine tools. The optimization loops require much time and are expensive. The present invention assists the aforementioned persons very significantly in terms of their object of carrying out the optimizations. The direct three-dimensional volume representation of deviations simplifies and shortens the iteration process. Here, it is a realistic goal to reduce the number of loop iterations from three to two or one. A difference from, and reason for novelty over, the previous methods in metrology lies in the fact that a dimension is missing in the 2D representation on a screen or on paper in order to be directly comparable to the workpiece. Moreover, the manipulation of the representation with a mouse in the case of representation on a screen requires more time outlay than the manipulation with virtual reality options.

In a special method variant, the deviation is corrected during the production or the post-processing of the shaping tool (also abbreviated as shape) in such a way that the newly produced or post-processed shaping tool has a shape deviation from the predefined model which is directed in an opposite direction to the deviation. The magnitude of the shape deviation and of the magnitude of the deviation can be equal or unequal. In this variant, a deviation can be over-compensated, produced in an opposite direction or inverted in its counterpart when producing or post-processing the shaping tool. That is to say, the shaping tool has, as a negative shape, a deviation from the predefined model (or the negative thereof) which is counter to the deviation between the point cloud or the point mesh, which is obtained from the real measurement values, and the point cloud/point mesh obtained by manipulation (or the deviation between the shaped article and the predefined model). As mentioned above, when plastic parts cool in a shaped manner, a deformation may arise, said deformation not being predetermined by the shape but being due to a cooling process. Thus, even if the shape corresponds to the template provided by a model, i.e. if it images an exact negative form of the model, the shaped article may deviate from the model, from the predefined model, on account of subsequent deformations and/or shrinkage, which are caused by cooling of the shaped material. By way of example, a shaped article may subsequently shrink; this is registered as a deviation in the method according to the invention, even though the shape is an exact negative of the predefined model. In this case, the shape is post-processed in such a way that it is larger than the predefined model in order to anticipate and compensate the subsequent shrinkage of a shaped article. Thus, the shape deviation of the shape from the predefined model ("larger", "too large") is embodied in the opposite direction to the deviation of the first article from the predefined model ("smaller", "too small"). This only represents one example of a multiplicity of examples of counter-compensation or overcompensation during the shape processing. A further example is a curvature which a first article has in relation to a predefined model and which is compensated by a curvature of the shape (at a corresponding location) in an opposite direction.

In step f) of the method, measurement values are manipulated in such a way that a dimensionally accurate part arises in the production process. It was already mentioned previously that, in step f) of the method, the point cloud or the point mesh can be moved beyond the predefined model during the manipulation such that the point cloud or the point mesh deviates in an opposite direction to previously. This serves the same purpose as mentioned in the previous paragraphs. This measure can find additional or alternative use in order to achieve the aforementioned purpose. This variant is also a type of counter-compensation or overcompensation in order, during the production or post-processing of a shaping tool on the basis of the manipulated point cloud/point mesh, to arrive at a shaping tool which anticipates a change in shape of a shaped article after the shaping process, in particular during cooling.

The point mesh can be embodied as a polygon mesh, in particular as a triangular mesh, or mesh.

A point cloud obtained by manipulation is also referred to as "manipulated point cloud"; a point mesh obtained by manipulation is also referred to as "manipulated point mesh".

The point cloud or the point mesh is manipulated, in particular, by displacement and/or (local) deformation in order to match the point cloud/the point mesh to the predefined model. A deformation can be effectuated in a region where deviations were determined.

During manipulation, points from the point cloud or points or regions from the point mesh are modified in terms of their position or their coordinates.

Matching to the predefined model also includes an approximation of the point cloud, or of points of the point cloud, or of the point mesh to the surface of the predefined model without points of the point cloud or regions or points of the point mesh having to be positioned exactly on or in the surface. Consequently, the point cloud or the point mesh need not correspond exactly to the predefined model after the manipulation. The term matching comprises an approximation and exact positioning.

Manipulated or displaced measurement values, which have a deviation from the real measurement values, are obtained when manipulating the point cloud/the point mesh.

When a value of a deviation is transmitted to the production machine, the method preferably includes:
ascertaining at least one value of a deviation between the point cloud or the point mesh, which is obtained from the real measurement values, and the point cloud/point mesh obtained by manipulation.

The production of further articles in step h) can be effectuated in one variant on the basis of the point cloud obtained by manipulation or of the point mesh obtained by manipulation by virtue of this forming a basis for a template for the further production process. In this case, it is not mandatory to ascertain and transmit deviations according to their value.

In another variant, however, deviations are ascertained according to their value and these values are used (in the form of correction values) in order to correct said deviations when producing a further article.

Deviation information is obtained in the process. The value of the deviation may be a value of the deviation between a measurement value and a manipulated measurement value. However, deviations can also be ascertained at any other location in the point cloud or in the point mesh, for example if a surface is placed through the points of the point cloud, as still described below, or if an interpolation is carried out between adjacent points and an interpolation point is formed, it then being possible to use said interpolation point as starting point or reference point for ascertaining a deviation.

It is possible to ascertain a plurality of deviation values at different locations, for example at adjacent locations, of the point cloud or of the point mesh, which is obtained from the real measurement values, and of the point cloud/point mesh obtained by the manipulation.

As mentioned, it is possible to place a surface through the points of the point cloud or of the point mesh. The deviation can be a deviation, in particular a distance between surfaces, wherein one surface is the surface of the point cloud or of the point mesh, which is obtained from the real measurement values, and a further surface is the surface of the point cloud/point mesh obtained by manipulation. A distance between surfaces, in particular a region-by-region distance in the form of a protrusion or indentation, can be referred to, or defined as, a deviation volume. Using the invention, deviation volumes can be represented in three dimensions by semi-transparent volumes such that the profile and the size of the deviations can be identified immediately.

In an embodiment of the method, a surface is placed through the real measurement values of the point cloud or through the point mesh, in particular through points of the point mesh, such that a surface representation of the article is obtained, and method steps d)-f) are as follows:

d) comparing the predefined model with the surface representation,
e) selecting at least one region from the surface representation which deviates from the predefined model,
f) manipulating this region of the surface representation by means of the gestural or head movement control such that real measurement values in this region are matched or approximated to the predefined model, and optionally
    ascertaining at least one value of a deviation between the surface representation and the manipulated surface representation. This deviation can be transferred in step g) if the production of further articles is to be effectuated on the basis of deviation corrections.

"A surface is placed" in a computational manner and according to methods which are known from the field of computer-aided design.

Information such as a value of the deviation or a point cloud obtained by manipulation or a point mesh can be transmitted to the computer-controlled production machine via a data transfer device. Here, use can be made of a wired or wireless data transfer device.

In an embodiment, the aforementioned transmission is effectuated in an automated manner. An identification feature, for example a QR code, can be assigned to the production machine and the articles produced therewith. The article underlying the method in step a) then has this identification feature, from which it is possible to identify the production machine with which it was produced. With the aid of the identification feature, there can be a transmission to the production machine which was used to produce the article and which is used in step h) to produce further articles.

In an embodiment, the measurement of surface coordinates of the article in step a) is effectuated multiple times and the real measurement values from a plurality of measurements are subject to statistical averaging and an averaged point cloud or an averaged point mesh is obtained therefrom in step b), said averaged point cloud or averaged point mesh forming the basis for the further method steps. Consequently, it is possible to represent measurement values from a measurement or statistical measurement results in the method and these may form the basis for the further method. Within the scope of manufacturing, current measurement results or the statistical data for each work sequence can be recalled easily and quickly.

In an embodiment, surface coordinates of the article are measured using a coordinate measuring machine that measures in a tactile or optical manner, a computed tomography scanner or an optical surface measuring machine, for example a structured light projector.

In an embodiment of the method, those values of the deviations which lie below a defined minimum value are ignored. Values below the minimum value, or threshold, represent values of deviations which are still tolerable. In this embodiment, deviations considered not to be relevant are removed or not taken into account and this prevents an unwanted overcorrection of correction data. Otherwise, the method also offers, in general, the option of control by the user in individual cases, where a correction is intended to be undertaken or not.

In an embodiment of the method, the three-dimensional representation is effectuated as a projection, pixel representation or hologram. Display devices that are fastened to the head, having a gesture or head movement control (also referred to as head tracking) are known, in general, from the prior art. The Microsoft Hololens® is a possible product. Using smartglasses such as e.g. a Hololens® or similar devices, there is the option of graphically representing articles in their surroundings in three dimensions and of manipulating these in three dimensions by way of head tracking, gesture identification or a graphics tablet.

When representing the predefined model and the point cloud, or the point mesh, with the display device, it is possible to present or highlight one or more deviations between the predefined model and the point cloud or the point mesh in order to be able to compare these better. Preferably, this is carried out by a representation in color or highlighting in color.

The following measures can be carried out and the following advantages can be obtained by the display device as defined above, even independently of the claimed method:

Assistance and acceleration when creating programs of CNC procedures. Examples: Illustration of minor details, probing at a greater immersion depth, simple observation from all sides, extended observation during simulation operation with realistic 3D views of workpiece, stylus combination, clamping means and CMM.

A simple definition of the measurement problems by assigning test features (such as diameter or roundness) from a virtual selection of test features to the point cloud or the point mesh. By way of example, the test feature is a geometric form such as a cylinder which can be superposed by the point cloud or the point mesh.

There can be assistance when putting together the stylus combination and/or the clamping aids from virtual selection representations ("kits") with probes and clamping means.

BRIEF DESCRIPTION OF THE DRAWINGS

The invention is described below on the basis of exemplary embodiments. In the drawings:

FIG. 1 shows a method sequence according to the invention.

DETAILED DESCRIPTION OF THE PREFERRED EMBODIMENTS

FIG. 1 highlights a method sequence according to the invention. The first article 2, here in the form of a cube, is measured using the coordinate measuring machine 1. The coordinate measuring machine 1 is coupled to the measurement computer 3, the display apparatus 4 being coupled to the latter. This display apparatus 4 is configured in the form of 3D smart-glasses, which can be put on by a user of the CMM 1. The display apparatus 4 has a device (not illustrated in any more detail) for gesture or head movement control, by means of which seen content can be manipulated, for example displaced or deformed, by gestures or head movements.

Measurement values obtained from measuring the coordinates of the article 2 are illustrated in a point cloud 5 in step S2. The point cloud 5 is formed from the individual measurement values and consequently represents the form of the cuboid 2 as a point cloud. Exemplary measurement values are denoted by the reference sign 8. Dashed lines, which represent the edges, but are not part of the point cloud and only serve for illustrative purposes, are plotted for illustrative purposes. However, it is possible likewise to present such auxiliary lines or areas, which form the side faces of the cuboid and in or on which the measurement values lie, by means of image processing measures. The point cloud 5 is represented in three-dimensional fashion in the display device 4 and consequently placed directly in front of the eyes of the user.

A predefined model 6, for example a CAD model of the article 2, is likewise presented on the display device 4 in step S3. The illustrations from step S and step S3 can be placed on top of one another. Then, the image from step S4 emerges, in which a comparison is undertaken between the predefined model 6 and the point cloud 5.

In step S4, the point cloud 5 is illustrated on the basis of the dashed edge lines in order to make the illustration clearer. It is clear from step S4 that the point cloud 5 and the predefined model 6 deviate from one another. For illustrative purposes, the deviation is presented in an extreme manner and, in practice, it is generally less. Two edge lengths of the article 2, in the x- and y-directions according to the coordinate system specified above, are shorter than in the predefined model 6.

Subsequently, the point cloud 5 is manipulated and a region of the point cloud is selected in steps S5 and S6 and this region is matched to the predefined model 6 until the point cloud 5 and the predefined model 6 are congruent, as illustrated bottom right in FIG. 1. Instead of matching, there can be an approximation until a deviation lies within a predetermined tolerance.

The point cloud 5 may be present as a surface representation when surfaces were placed through the points in order to create a graphically represented closed body. Expressed differently, the point cloud then is also available in the form of a cuboid which, in the x- and y-directions, has different edge lengths than the predefined model 6. A manipulation can be undertaken accordingly on this cuboid obtained from the point cloud.

The representations in steps S4, S5 and S6, as shown in FIG. 1, are effectuated on the display device 4. The manipulation in step S6 is effectuated by means of a head or gesture control, in particular by means of the hand.

In step S7, the edge length deviations ΔX and ΔY are evaluated according to the value. In general, steps in the method can be carried out more or less simultaneously. If it is expedient, sequences of steps may also be modified. By way of example, step S7 may occur before steps S5 and S6, in particular simultaneously with step S4 as well.

The deviation values ΔX and ΔY ascertained in step S7 are transmitted to the production machine 7 in step S8, which is effectuated from the measurement computer 3 of the coordinate measuring machine 1 to the production machine 7 by a data transfer device 8. The data transfer device 8 can be a wire-based or radio-based data transfer line.

The production process is corrected in the production machine 7, i.e. the edge lengths in the x- and y-directions are corrected on the basis of the determined deviations ΔX and ΔY and further articles 2' are produced in step S9, said further articles having been corrected in relation to the article 2. The article 2 also originated from the production machine 7, or was produced by the latter.

The invention claimed is:

1. A method for correcting deviations in a production process of an article, the method comprising:
measuring surface coordinates of a first produced article,
representing, in three dimensions, a measured model based on the measured surface coordinates, wherein the measured model is displayed to a user using a display apparatus that is configured to be fastened to a head of the user, wherein the measured model is in the form of a point cloud or a point mesh, and wherein the display apparatus has a gesture or head movement control for manipulating displayed representations,
representing to the user, in three dimensions, a predefined model of the article using the display apparatus,
comparing the predefined model to the measured model,
selecting, in response to user input, multiple regions of the measured model that deviate from the predefined model,
in response to receiving user input via the gesture or head movement control, manipulating each of the selected multiple regions to create a modified model such that the user identifies, for each region of the selected multiple regions, whether a corresponding region of the modified model is:
  i) matched to the predefined model,
  ii) approximated to the predefined model until the corresponding region deviates from the predefined model by less than a predetermined tolerance, or
  iii) moved beyond the predefined model such that the corresponding region deviates from the predefined model in an opposite direction from how the selected region deviates from the predefined model,
transmitting, to a computer-controlled production machine or a machine for shaping tool production or shaping tool processing, (i) a value of a deviation between the measured model and the modified model or (ii) the modified model, and
producing a second produced article in the production machine or producing a post-processing of a shaping tool for producing the second produced article, wherein the producing is performed (i) to correct or compensate the deviation or (ii) based on the modified model.

2. The method of claim 1, wherein:
measuring the surface coordinates of the first produced article includes measuring the surface coordinates of the first produced article multiple times,
the method further comprises statistically averaging the measured surface coordinates,
an averaged point cloud or an averaged point mesh is obtained from the averaged measured surface coordinates, and
the measured model is in the form of the averaged point cloud or averaged point mesh.

3. The method of claim 1, wherein measuring the surface coordinates of the first produced article includes measuring the surface coordinates of the first produced article using:
a coordinate measuring machine that measures in a tactile or optical manner,
a computed tomography scanner, or
an optical surface measuring machine.

4. The method of claim 1, further comprising ignoring values of deviations that lie below a defined minimum value.

5. The method as claimed in claim 1, wherein representing, in three dimensions, the measured model includes representing the measured model as a projection, a pixel representation, or a hologram.

6. The method of claim 1, further comprising:
placing a surface through the measured model to obtain a surface representation of the first produced article, wherein:
  comparing the predefined model to the measured model includes comparing the predefined model to the surface representation,
  selecting a first region of the selected multiple regions of the measured model includes receiving a selection of the region of the surface representation that deviates from the predefined model, and manipulating the first region of the measured model includes manipulating the region of the surface representation to create a modified model such that the corresponding region of the modified model is matched or approximated to the predefined model until the corresponding region deviates from the predefined model by less than a predetermined tolerance; and ascertaining a value of a deviation between the surface representation and the manipulated surface representation.

7. The method of claim 1, wherein the deviation is corrected during the production or the post-processing of the shaping tool in such a way that the produced or post-processed shaping tool has a shape deviation from the predefined model that is directed in an opposite direction to the deviation.

\* \* \* \* \*